US006000484A

United States Patent [19]

Zoretich et al.

[11] Patent Number: 6,000,484

[45] Date of Patent: Dec. 14, 1999

[54] ARTICULATING WHEELED PERMANENT MAGNET CHASSIS WITH HIGH PRESSURE SPRAYER

[75] Inventors: Carl Zoretich, Duluth; Daniel Garman, Evelth, both of Minn.

[73] Assignee: Aqua Dynamics, Inc., Eveleth, Minn.

[21] Appl. No.: 08/719,993

[22] Filed: Sep. 25, 1996

[51] Int. Cl.[6] ........................ B60B 39/00

[52] U.S. Cl. ........................ 180/7.1; 180/21; 180/235; 180/901; 280/124.111; 301/5.1

[58] Field of Search ........................ 180/7.1, 21, 164, 180/235, 8.2, 901; 305/6, 60; 301/1, 5.1; 280/124.111

[56] References Cited

U.S. PATENT DOCUMENTS

| | | | |
|---|---|---|---|
| 2,030,840 | 2/1936 | Allen | 180/901 |
| 2,694,164 | 11/1954 | Geppelt | 301/5.1 |
| 3,690,393 | 9/1972 | Guy | 180/901 |
| 3,734,565 | 5/1973 | Mulasmajic | 301/5.1 |
| 5,355,807 | 10/1994 | Pelrine et al. | 180/901 |

FOREIGN PATENT DOCUMENTS

| | | | |
|---|---|---|---|
| 0012482 | 1/1987 | Japan | 180/901 |
| 2029246 | 3/1980 | United Kingdom | 180/901 |

*Primary Examiner*—Anne Marie Boehler
*Attorney, Agent, or Firm*—D. L. Tschida

[57] ABSTRACT

A remotely controlled, magnetic wheeled vehicle having a high pressure spray head for cleaning ferromagnetic surfaces. An articulating CHASSIS supports a variable frequency motor, gear reducers, drive axles, a servo motor steering linkage and multiple, laminated permanent magnet wheels. Resilient bushings and split, spring biased torsion hubs independently support the drive axles and each wheel to accommodate changes in surface contour. An adjustable tool head gantry mounts to either the fore or aft axle to support a rotary, multi-orifice sprayer. Control switches and a passive, magnetic anchor and tether protect the equipment while in use. In a second configuration, a sectional chassis framework surrounds the motor and a pair of drive chains transfer power through geared reducers to each axle. Springs are mounted to the aft frame section to provide a torsion suspension at the aft wheels.

22 Claims, 7 Drawing Sheets

ARTICULATING WHEELED PERMANENT MAGNET CHASSIS WITH HIGH PRESSURE SPRAYER

BACKGROUND OF THE INVENTION

The present invention relates to a vehicle having a magnetic drive for conveying a variety of tool heads over ferromagnetic surfaces to accommodate the treating of the surfaces (e.g. cleaning or painting). In a particular CHASSIS construction, a number of laminated, permanent magnet wheels are mounted to independent suspensions at each axle to convey a drive CHASSIS and tool head over the support substrate.

Maintenance activities for a variety of ferromagnetic or metal surfaces, such as found in ships and at the interior and exterior surfaces of storage tanks, are normally performed manually after a system of scaffolds and other work supports are erected. The manual nature of such operations and the extensive setup and disassembly activities are very time consuming and economically costly A variety of magnetic vehicles have been developed to reduce the foregoing setup and disassembly activities. Examples of various of these vehicles are shown a U.S. Pat. Nos. 3,682,265; 3,777,834; 3,960,229; 4,789,037; 4,890,567; and 5,285,601. Common to all of these vehicles is a track driven vehicle which contains a series of either electromagnets or permanent magnets mounted to the tracks or to the vehicle. The magnets rotate with the tracks and progressively engage and disengage the work surface. A variety of metal surface conditioning tool heads are also fitted to the vehicles.

Although track drives provide a number of magnet elements which simultaneously contact the support surface to enhance the magnetic attraction, a variety of shortcomings exist. The vehicles frequently include separate drive assemblies at each track which increases the cost and weight of the vehicle. Reduced magnetic attraction is also experienced when working on surfaces having tight curvatures or surface transitions as the magnets span the curvatures and transitions with reduced surface contact. Difficulties also frequently occur in steering or maneuvering the separate tracks. Steering adjustments are most commonly made through independent braking and speed adjustments to the tracks.

In appreciation of the foregoing deficiencies of known magnetic vehicles, the wheeled vehicle of the invention was developed to provide a light weight chassis which is driven by a single motor and supported from a number of permanent magnet wheels. An articulating chassis and independent, resilient suspensions support each of the wheels to optimize wheel contact with the surface and especially upon encountering elevation changes. The chassis is remotely steered and able to support a variety of tool heads at either end of the chassis.

SUMMARY OF THE INVENTION

It is accordingly a primary object of the invention to provide a wheeled vehicle that supports one or more tool heads and has a number of permanent magnet wheels which support the vehicle to a ferromagnetic surface.

It is a further object of the invention to provide a chassis that is capable of supporting a variety of tool heads and wherein the magnetic force of the wheels is adequate to support the vehicle weight and repulsive working forces generated at the tool head.

It is a further object of the invention to provide permanent magnet wheels which are constructed of a number of laminated pole pieces and annular keepers or pulls.

It is a further object of the invention to provide an independent, torsion suspensions at the axles to accommodate elevation variations in the support surface.

It is a further object of the invention to provide wheels which are mounted to a resilient or flexible bearing surface to permit an independent pivot action at each wheel relative to a coaxial longitudinal axis along each support axle and through the bore of each wheel.

It is a further object of the invention to provide an articulating chassis and a remotely operated, servo controlled steering linkage which couples to the separate CHASSIS sections.

It is a further object of the invention to provide a chassis that is constructed with minimal weight and able to fit through restricted manhole or access ports.

Various of the foregoing objects, advantages and distinctions of the invention are obtained alternatively disclosed vehicles. One, presently preferred vehicle is constructed about the housing of a drive motor. Permanent magnet wheels are fitted to live axles which provide a torsion suspension at each axle and resilient movement at each wheel. Each wheel is constructed of a number of permanent magnet pole pieces which are fitted to an annular keeper. Multiple sets of pole pieces and keepers are laminated together at each wheel. A resilient bushing is fitted to the core of each wheel and concentrically mounted about each axle to permit the flexing of each wheel at its supporting axle. Rigid shims at each wheel substantially restrict the wheel flexion to a vertical axis normal to a working surface.

Fore and aft pairs of axles are supported to gear reduction drives and torsion spring hubs which extend from forward and aft sections of the drive motor. Drive power is transferred to the gear drives through flexible (e.g. U-joint) couplers. The chassis sections articulate about resilient pivots. A remotely operated servo controlled screw follower steering linkage steers the fore and aft sections.

A safety switch is provided to prevent damage to electrical control and high pressure supply lines which couple to the motor and a high pressure sprayer fitted to the chassis. A safety tether and anchor supports the chassis to a work surface.

An alternative vehicle is also disclosed which is fitted to articulating fore and aft frames. Chain drives supply drive power to fore and aft gear assemblies and included drive axles and laminated permanent magnet wheels. Springs fitted between the aft frame section and the aft gear assembly torsionally suspend the aft axles.

Still other objects, advantages and distinctions of the invention will become more apparent from the following description with respect to the appended drawings. The description should not be literally construed in limitation of the invention. Rather, the invention should be interpreted within the broad scope of the further appended claims.

BRIEF DESCRIPTION OF THE DRAWINGS

In the drawings, like element designations refer to like parts throughout, and.

DESCRIPTION OF THE PREFERRED EMBODIMENT

Figure 1:
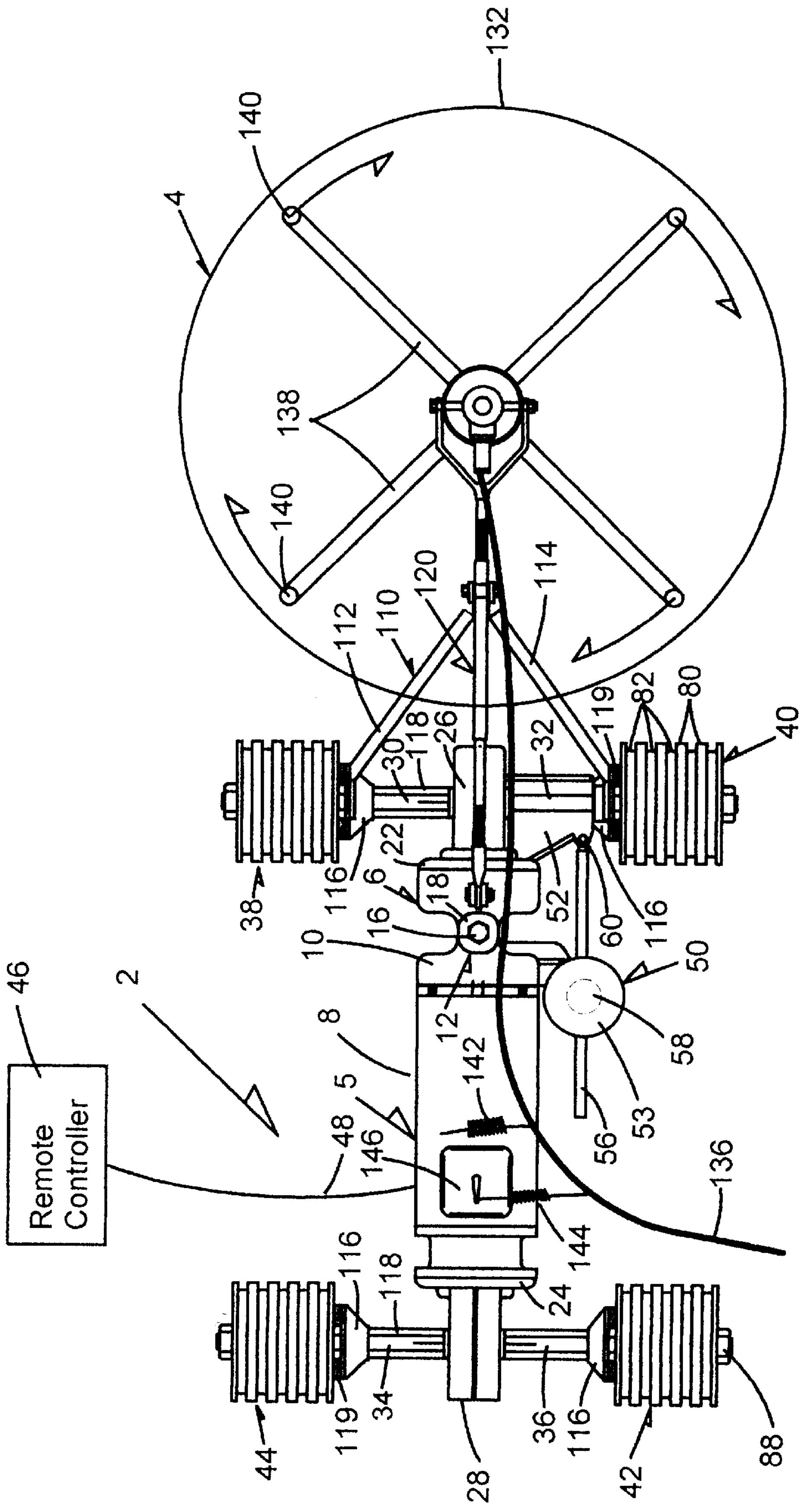
FIG. 1 is a top plan view of the magnetic vehicle fitted with a high pressure water spray head and wherein the spray head is shown in cutaway.
Figure 2:
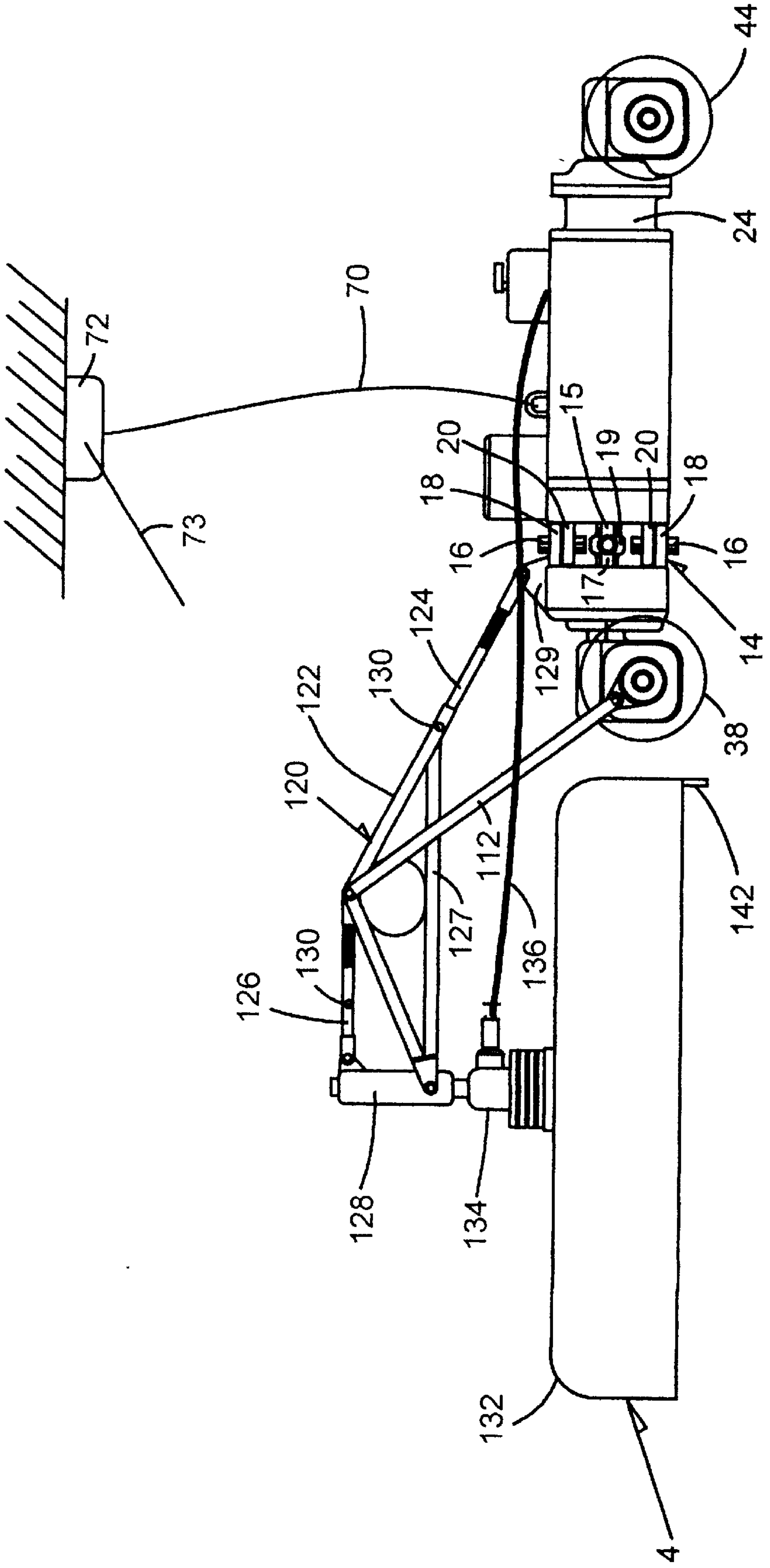
FIG. 2 is a left side elevation view of the vehicle and sprayer.

Referring to FIGS. 1 and 2, top and side views are shown to a wheeled permanent magnet vehicle 2 which supports a high pressure liquid spray head 4. The vehicle 2 provides an articulating drive assembly having independent forward and rear support chassis sections 5 and 6. The rear chassis section 5 is constructed about the housing 8 of a frequency controlled motor 10.

The separate chassis sections 5 and 6 are secured together at upper and lower pivot joints 12 and 14, reference FIG. 2. Pivot pins 16 secure mating couplers 18 and 20 at each of the joints 12 and 14. The pivot pins 16 mount through resilient (i.e. elastomer) bushings fitted to bores at mating couplers 18 and 20 to permit a freedom of motion at the pivot joints 12 and 14 which allows the chassis sections 5 and 6 to follow and accommodate elevation changes at working surfaces that are not uniformly smooth. Although one type of pivot joints 12 and 14 are shown, a variety of resilient pivots, including U-joints and cable joints, can also be incorporated into the vehicle 2.

Mounted to fore and aft ends of the housing 8 are torsion hubs 22 and 24 which mate with a pair of gear reduction drives 26 and 28. An output shaft 15 which extends from fore and aft ends of the motor 10 is coupled to input shafts 17 to the gear reduction drives 26 and 28 at U-joints 19, one coupling of which is shown in FIG. 2 to the hub 22. A number of axles 30, 32, 34 and 36 having geared ends are coupled to the reduction drives 24 and 26 and terminate at a number of permanent magnet wheels 38, 40, 42 and 44. The pairs of axles 38, 40 and 42, 44 are independently and resiliently suspended to the chassis sections 5 and 6 via torsion springs contained within the torsion hubs 22 and 24 and which torsion hubs 22 and 24 are discussed in more detail below.

Figure 8:
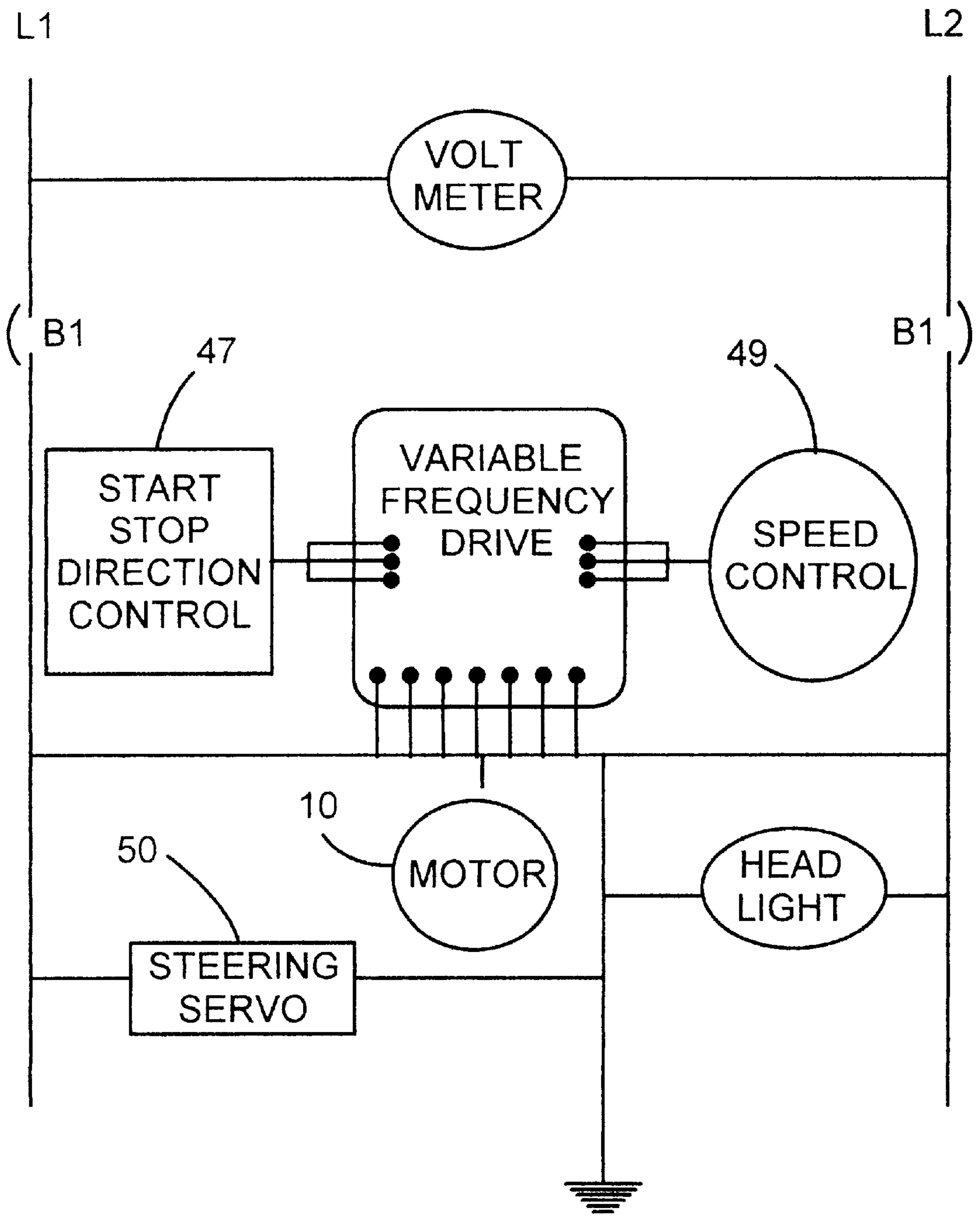
FIG. 8 is a schematic diagram to the control circuitry of the vehicle.

The gear reduction drives 26 and 28 presently provide a conversion ratio of approximately 150:1. For a nominal motor speed of 900 rpms, the wheels 38–44 are driven at approximately 6 rpms, which is sufficient for the liquid spray head 4 that is used to clean the interior of an oil storage tank. Pulsed drive signals are supplied to the motor 10 from a conventional remote controller 46. A multi-conductor cable 48 couples the controller 46 to the motor 10. Line conductors L1 and L2 are switched at relay contacts B1 and B2. The controller 46 includes separate start-stop and direction control circuitry 47 and speed control circuitry 49, reference FIG. 8. A wireless, RF controller may be substituted for the controller 46. A head light can also be mounted to the vehicle 2.

The forward chassis section 6 is steerable relative to the aft chassis section 5 with a steering assembly 50 that mounts between the motor housing 8 and a bracket 52 that mounts to the gear reduction drive 26 and about the axle 32. The assembly 50 includes a servo motor 53 that is secured to the housing 8 at a bracket 54. A threaded screw follower steering arm 56 is coupled to a complementary screw drive head 58 (shown in dashed line) at the bottom of the servo motor 53. A pin coupler 60 secures the arm 56 to the bracket 52. Rotation of the drive head 58 extends and retracts the arm 56 a corresponding plus or minus 3 inches. The operating range of the arm 56 can be adjusted relative to the dimensions of the frame sections 5 and 6 to provide a sufficient turning radius (e.g. 10–45 degrees) at the wheels 38 and 40. The turning radius should be sufficient to permit normal side to side adjustment of the vehicle 2 with each circumferential traversal of a tank being cleaned. The turning radius of the vehicle 2 accommodates relatively wide ranging lateral adjustment to steer the vehicle 2 about a work surface, which adjustments are more smoothly obtained than with track vehicles. The steering adjustments are also made in shorter distances than with track vehicles.

With additional attention to FIGS. 3 to 7, details are shown to the construction of the wheels 38–44 and the nature of the independent, resilient suspension that supports each axle 30–36 and wheel 38–44. An independent suspension is provided at each wheel to maintain the tangential contact between each wheel and a ferromagnetic work surface. The wheels 38–44 are thereby able to negotiate contour and elevation changes in the work surface which otherwise might dislocate or reduce the strength of the magnetic coupling of the wheels 38–44 to the work surface.

The vehicle 2 particularly provides a torsion suspension at each axle pair 30, 32 and 34, 36 which allows the axles 30–36 to rotate at the hubs 22 and 24. A separate controlled flexion is obtained at the axles 30–36 via the hubs 22 and 24. The provided independent suspension maintains contact between each wheel and the work surface and is discussed in greater detail below in relation to FIGS. 4–7.

Diminished or lost contact between the wheels and a metal work surface, especially side wall and ceiling surfaces, can result in the detachment of the vehicle 2. In such an event, a safety tether 70 and anchor 72 are provided to catch the vehicle 2, reference FIG. 2. The anchor 72 may comprise a tie-off hook or a magnet that is sized to withstand the weight of the vehicle 2 and any shock forces upon reaching the end of the tether 70. A lever arm 73 at the anchor 72 facilitates movement of the anchor at a safety surface. A variety of suction type devices may also be used to advantage at the anchor 72.

Figure 3:
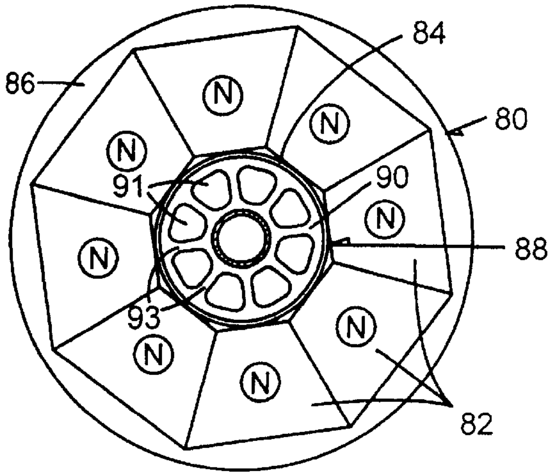
FIG. 3 is an elevation view of a number of aligned, trapezoidal rare earth permanent magnet pole pieces fitted to an annular keeper and which form one of a number of laminated permanent magnet pole sets that define each wheel.
Figure 5:
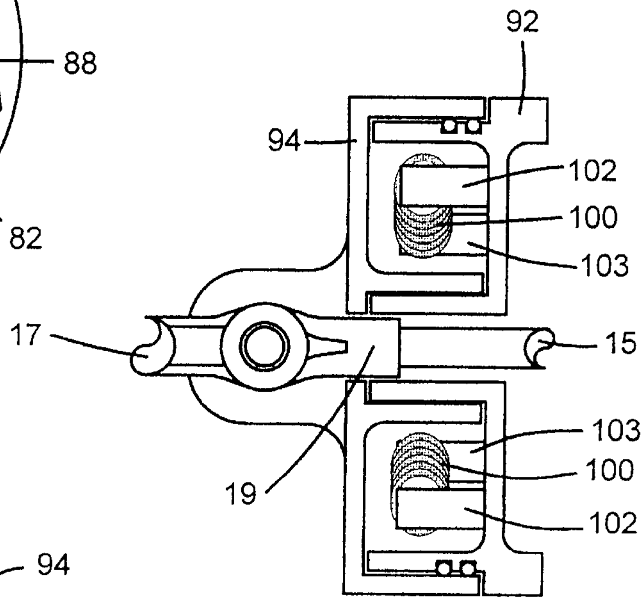
FIG. 5 is a vertical cross section view through the concentric shells of one of the torsion spring hubs showing the coupling of the torsion springs to the concentric shells.
Figure 4:
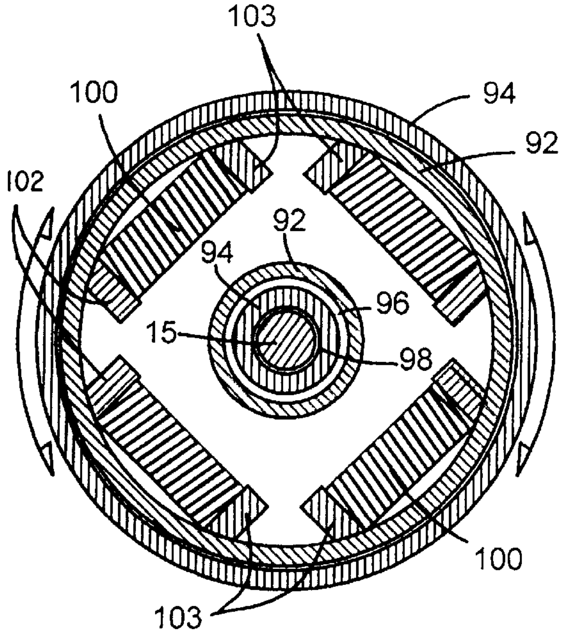
FIG. 4 is an end-on cross section view through one of the torsion spring hubs which support the front and rear axles.

FIG. 3 depicts the construction of one of a number of laminated pole sets 80 that form each wheel. Each pole set 80 is presently constructed of eight anistropic, trapezoidal, rare earth north "N" pole pieces 82 which are arranged about the bore 84 of an annular metallic keeper or pull 86. The pole pieces 82 are formed from mixtures of rare earth materials, for example, neodymium with metallic powders. A variety of mixtures including neodymium, iron, boron or samarium cobalt may also be used.

The keepers or pulls 86 concentrate the magnetic force of the pole pieces 82 at the circumference of each pull 86. Presently five pole sets 80 are used at each of the wheels 38–44 and one additional keeper 86 is provided at a lock nut 88 that retains each wheel 38–44 to its axle.

The foregoing wheels 38–44 are each capable of supporting 300 to 500 pounds and collectively are sized to support the weight of the vehicle 2 and the force exerted by the spray head 4 with a margin for safety. The magnetic force of each wheel can be adjusted by adding pole sets 80 to accommodate differing tool heads. One or more of the wheels 38–44 might also be sized to provide an increased gripping strength from the others to offset surface inconsistencies and better maintain surface contact.

Press fit through the bore 84 of the laminated pulls 86 as part of a wheel coupler is a bushing 88 that has an elastomer core 90. The core 90 includes a number of longitudinal bores 91 which define a number of spokes 93. The spokes 93 allow each wheel to float relative to its axle 30–36 as dirt or debris or depressions are contacted by some of the pulls 86 to cause a lifting or falling of one end of the wheel which is compensated by movement at the opposite end of the wheel. In lieu of a continuous bushing 88, separate bushing segments might be provided at each pole set 80 to provide a greater degree of flexion over the contact area of each wheel 38–44 with the work surface.

Figure 6:
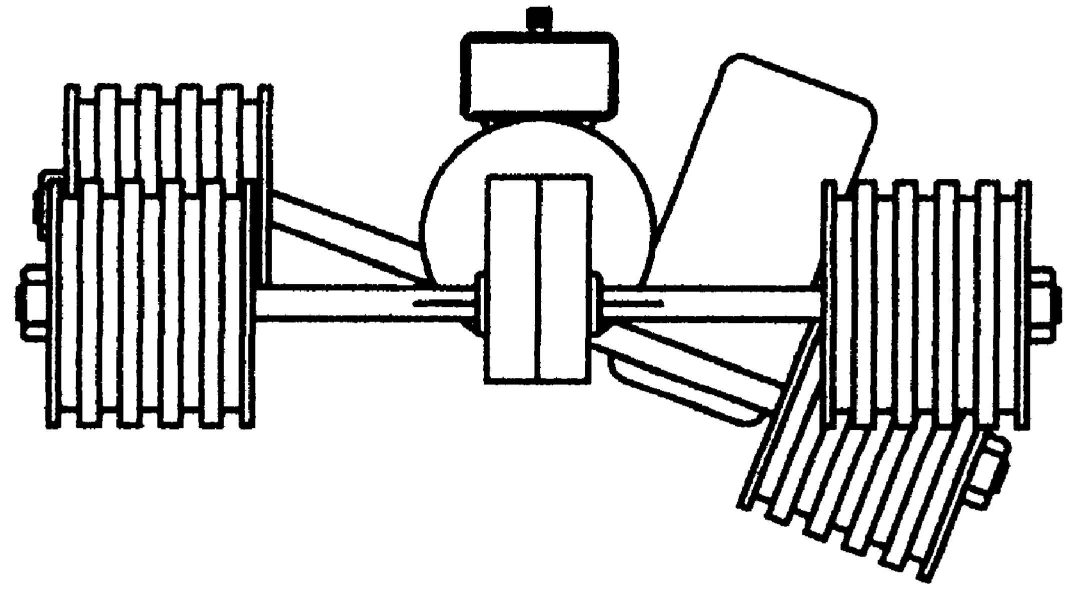
FIG. 6 is an end view showing the torsion suspension of the wheels at the forward torsion hub and the flexible coupling of the left front wheel to the front axles to flex independent of axle rotation.
Figure 7:
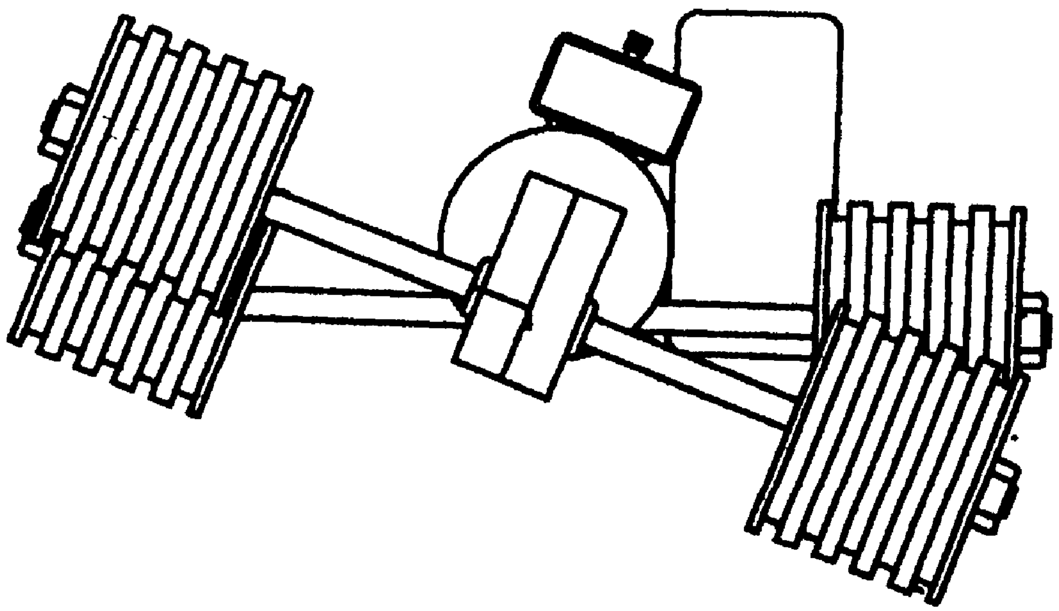
FIG. 7 is an end view showing the torsion suspension of the wheels to the aft torsion hub and the flexible coupling of the left front wheel to the front axles to follow the left aft wheel.

Referring to FIGS. 4–7, rotation of the axles 30–36 relative to the surface irregularities is obtained at the torsion hubs 22 and 24. Each hub 22 and 24 provides a pair of concentric housings or shells 92 and 94 which independently rotate at a bearing surface 96. The housings 94 in turn are attached to the gear reduction drives 26 and 28 and from which the axles 30–36 and wheels 38–44 extend. A bore 98 at the bushing 96 independently permits the input shafts 17 from the motor 10 to pass through the torsion hubs 22 and 24 to couple with the reduction drives 26 and 28 to drive the axles 30–36 and wheels 38–44. Opposite ends of four spiral wound springs 100 are secured to the housings 92 and 94 at fasteners 102 and 103. The housings 92 and 94 are thereby able to rotate about the bushing 96 as changes in the support surface induce the wheels 38–44 to rise and fall. A variety of alternative positional changes that are accommodated at the axles 30–36 and wheels 38–44 of the chassis sections 5 and 6 are shown at FIGS. 6 and 7. FIGS. 6 and 7 particularly depict the operation of the independent torsion suspensions at the forward and aft axle pair 30, 32 and 34, 36. Also shown at the left front wheel is an example of the independent flexion obtained at each of the wheels 38–44 which permits the wheels 38–44 to flex at the bushing 88 from the longitudinal axis through the wheels 38–44.

Collectively, the articulation of the chassis sections 5 and 6 and the independent suspension of each axle 30–36 at the hubs 22 and 24 and flexion of the wheels 38–44 at the axles 30–36 has proven adequate to maintain contact between the vehicle 2 and a typical working surface. The vehicle 2 offers particular advantages when used to clean storage tanks where the walls can frequently contain a sludge build up of ½ to 1 inch. The resultant erratic surface contours can effect wheel contact.

Turning attention to the spray head 4 at FIGS. 1 and 2, the head 4 is supported to the forward chassis 6 from a framework 110. A pair of wing arms 112 and 114 extend from a pair of collars 116 that are mounted to an axle sleeve 118 at the axle 30 and to the bracket 52. The wing arms 112 and 114 mount to a telescoping center column 120. Similar collars 116 and sleeves 118 are fitted to the aft axles 34 and 36.

A number of solid, nonmagnetic shims 119 are fitted between the collars 116 and wheels 38–44 to limit and reduce any lateral flexion of the wheels 38–44 which is otherwise possible due to the use of the bushings 88. Potential wheel slippage during turning is thereby reduced.

The column 120 is constructed of a number of telescoping sections 122, 124 and 126 which extend between a collar 128 and a bracket 129 at the hub 22. A cross brace 127 extends between the section 122 and collar 128. Set screw fasteners 130 fix the relative extensions of the column sections 122–126 and thereby the orientation and displacement of a circular shroud 132 at the spray head 4 relative to the work surface being cleaned. The proper orientation of the shroud 132 is normally established with the initial setup of the vehicle 2 to a work surface. Hydraulic or electronic actuators can also be added to the column 120 to provide controlled automatic adjustments.

A manifold 134 depends from the collar 128 and a liquid supply line 136 is coupled to the manifold 134. Four spray arms 138 rotate about the manifold 134 beneath the shroud 132. Spray orifices or jets 140 are secured to the arms 138 and provide a cleaning pressure of between 5,000 to 30,000 psi. Such pressures are sufficient to clean thick sludge, scale, paint or the like from a variety of metallic surfaces.

A squeegee 142 is fitted to the shroud 132 and removes flaked debris prior to contact with the wheels 38–44. The height of the squeegee 142 is adjustable to facilitate the removal of debris without effecting the contact between the vehicle 2 and metal surface. Although the spray head 4 is shown mounted to the forward chassis section 6, the head 4 might be mounted to the aft chassis section 5. In all cases, the head 4 preferably precedes the motor 10 to assure a clean running surface for the wheels 38–44. The initial starting area is typically hand scraped.

The liquid supply line 136 is supported to the motor housing 8 at a primary safety spring 142, e.g. 30 pounds spring force. A secondary spring 144, e.g. 5 pounds spring force, and associated switch 146 cooperate with the spring 142 to cut pressure to the line 136 and drive power to the motor 10 in the event snags or restrictions occur at the cabling 48 and liquid line 136 etc., until the problem is cleared.

In addition to the noted flexibility of vehicle movement, the articulated construction of the vehicle 2 and sprayer 4 permits ready assembly and re-assembly inside tanks having 18 inch manholes. The chassis sections 5 and 6 also accommodate a variety of conventional tool heads (e.g. sand and particle blasters, painters, burners etc.) and whereby the vehicle 2 can be used to treat, clean or paint a variety of metal surfaces. It is also to be appreciated the vehicle 2 can be configured to permit use within pipes or on flat surfaces. If used within pipes, adjustable idler wheels might be included at arms which radially extend from the vehicle 2 to position the vehicle 2 within the pipe. Accessory wheels might also be mounted to the vehicle 2 to assist in locating or moving the vehicle 2 or use on flat surfaces.

Figure 9:
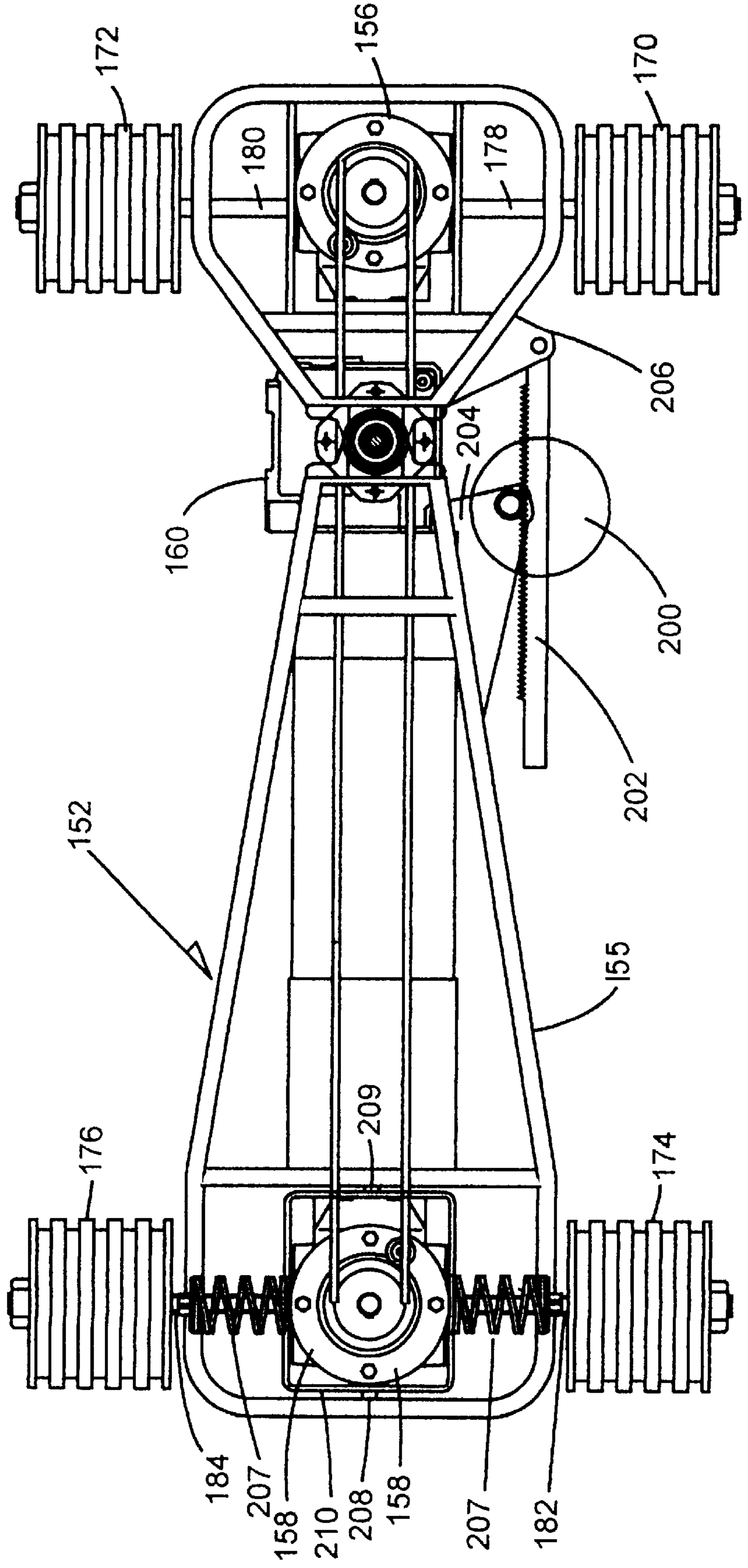
FIG. 9 is a top plan view of an alternative construction of an articulating magnetic vehicle having fore and aft frame sections which support a high pressure water spray head and provide a torsion suspension for the rear axles.
Figure 10:
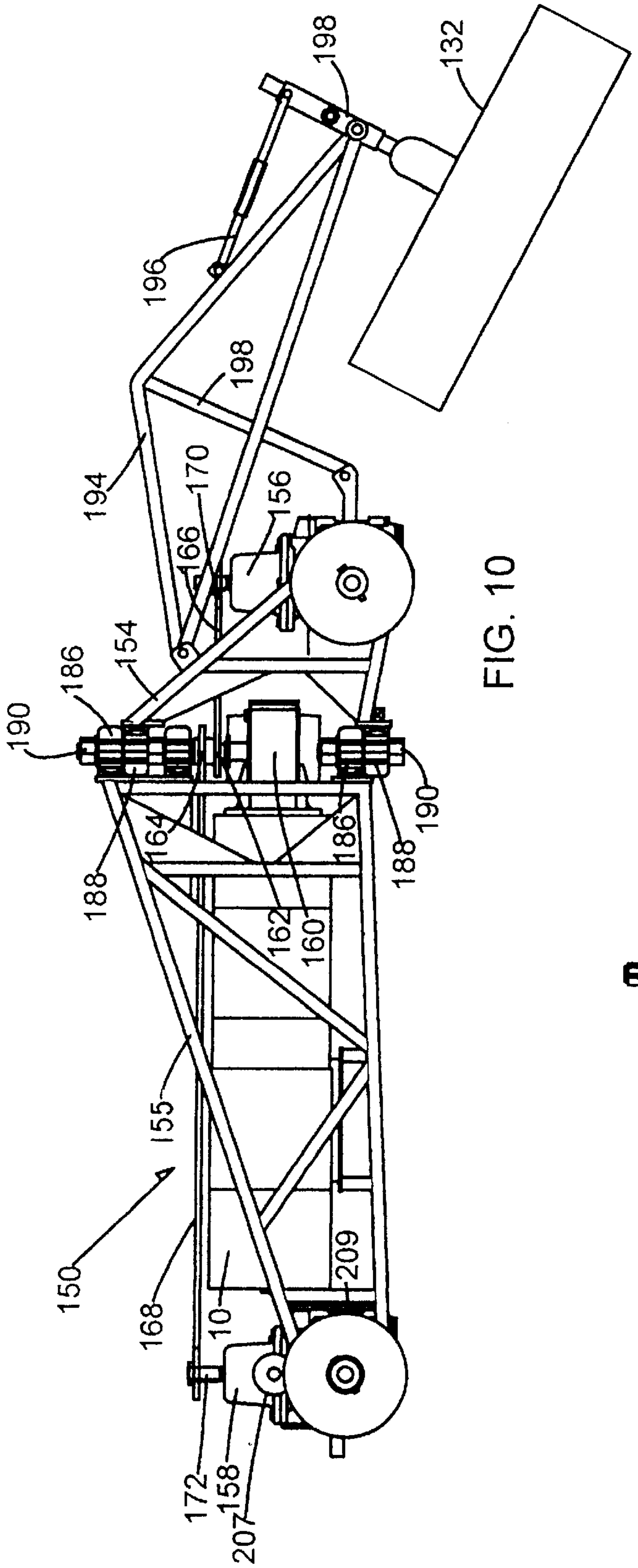
FIG. 10 is a right side elevation view of the vehicle and sprayer of FIG. 9.
Figure 11:
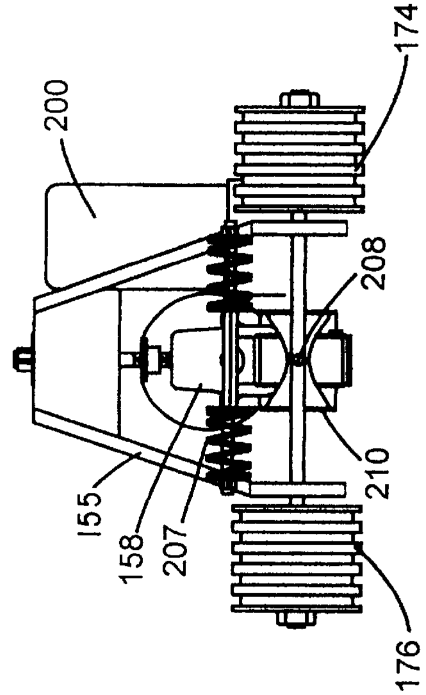
FIG. 11 is an end view of the aft frame section with a pivot joint exposed.

FIGS. 9, 10 and 11 depict another construction of a frame mounted permanent magnet vehicle 150. The principal difference between the vehicles 2 and 150 is that the vehicle 150 is configured with a support framework 152 and chain drives to power the wheels. The framework 152 is configured with forward and aft articulating sections 154 and 155.

A gear transfer drive 156 is fitted to the forward section 154. The motor 10 and a gear transfer drive 158 are fitted to the aft section 155. A gear reduction drive 160 extends from the motor 10 and a vertical output shaft 161 supports a pair of sprockets 162 and 164 and chains 166 and 168. The chains 166 and 168 extend to sprockets 170 and 172 at the transfer drives 156 and 158 to appropriately transfer drive power to permanent magnetic wheels 170–176 fitted to axles 178–184.

The frame sections 154 and 155 pivot at pairs of pillow blocks 186 and 188 which are interconnected with pivot fasteners 190. A high pressure sprayer head 4 is supported to a framework 194 that extends from the frame section 154. Arms 195, 196, and 198 pivot about the frame 154. A telescoping cylinder 199 cooperates with the arms 195, 196 and 198 to adjust the inclination of the shroud 132 and displacement to the work surface.

Steering is effected with a servo motor 200 and a screw follower arm 202. The servo motor 200 mounts to the frame section 155 at a bracket 204 and the arm 202 mounts to a bracket 206 at the frame section 154.

A torsion suspension is provided at the aft wheels 174, 176 via a pair of springs 207. The springs 207 are retained between the frame 155 and a housing 210 of the gear driver 158. A pair of pivots 208 and 209 support the housing 210 to the frame and cooperate with the springs 207 to maintain an equilibrium position at the housing 210. The aft axles are also supported in vertical slots in the aft frame 155.

While the invention has been described with respect to a preferred construction, still other constructions may be suggested to those skilled in the art. The foregoing description should therefore be construed to all those embodiments within the spirit and scope of the following claims.

What is claimed is:

1. A magnetic vehicle comprising:

a) a chassis including a drive motor and a plurality of axles which support a plurality of permanent magnet wheels;

b) suspension means for resiliently supporting said wheels to said chassis and including a plurality of torsion means for each resiliently biasing said axles relative to a support surface, wherein each torsion means includes first and second concentric shells that are coupled to one another with a plurality of springs, and wherein one of said axles is coupled to said first shell and said second shell is coupled to said chassis; and c) steering means for directing said chassis.

2. A vehicle as set forth in claim 1 including first and second torsion means, wherein first and second front axles are coupled to the first shell of one of said first and second torsion means and first and second rear axles are coupled to the first shell of the other of said first and second torsion means and wherein the second shell of the first and second torsion means are coupled to the chassis.

3. Apparatus as set forth in claim 1 wherein each of said plurality of permanent magnet wheels comprises a pole set that includes a plurality of magnetic pole pieces circumferentially arranged about a bore of an annular keeper.

4. Apparatus as set forth in claim 3 wherein each permanent magnet wheel comprises a plurality of pole sets that are coupled side by side to one another such that a peripheral surface of each keeper defines a rolling surface of the wheel and wherein coupler means flexibly support each wheel to one of said axles.

5. A vehicle as set forth in claim 4 wherein said suspension means comprises first and second torsion means, wherein first and second front axles are coupled to the first shell of one of said first and second torsion means and first and second rear axles are coupled to the first shell of the other of said first and second torsion means and wherein the second shell of the first and second torsion means are coupled to the chassis.

6. A vehicle as set forth in claim 5 wherein said first and second torsion means respectively mount to first and second gear reduction drives, and wherein said first and second gear reduction drives respectively support said first and second front axles and said first and second rear axles.

7. A vehicle as set forth in claim 6 wherein one of said first and second torsion means is secured to the drive motor and wherein a pivot means having a pivot pin couples the other of said first and second torsion means to said drive motor such that said first and second front axles and said first and second rear axles articulate relative to said pivot pin.

8. A vehicle as set forth in claim 7 wherein said steering means includes a servo motor and a linkage responsive to said servo motor coupled to one of said first and second front or rear axles to steer said chassis.

9. A vehicle as set forth in claim 8 wherein said chassis supports a tool means for operating on a ferromagnetic support surface over which said wheels roll.

10. A vehicle as set forth in claim 9 including a plurality of conductors and/or conduits coupled to said chassis and means responsive to a restriction of movement of said conductors and/or conduits for disabling vehicle movement.

11. A vehicle as set forth in claim 3 wherein each of said wheels comprises a plurality of pole sets, wherein each pole set includes a plurality of magnetic pole pieces radially displaced from a bore of an annular keeper, wherein a peripheral surface of each keeper defines a rolling surface of the wheel, wherein a resilient bushing is fitted through the bore of the keeper of each pole set, and wherein one of said axles is fitted through a bore of said bushing.

12. Apparatus as set forth in claim 11 including means for restricting the flexion of each wheel relative to the support surface.

13. A vehicle as set forth in claim 1 wherein said chassis comprises first and second frame sections, wherein pivot means having a pivot pin couple said first and second frame sections to one another to articulate at said pivot pin about one another, wherein said axles mount to first and second gear reduction drives coupled to said first and second sections, and wherein a chain couples said motor to said first and second gear reduction drives.

14. A vehicle as set forth in claim 13 wherein said steering means ncludes a servo motor and a steering linkage responsive to said servo motor and coupled to one of said first and second frame sections to steer said vehicle.

15. A magnetic vehicle comprising:

a) a chassis including a drive motor and a plurality of axles which support a plurality of permanent magnet wheels;

b) suspension comprising first and second torsion means for spring biasing first and second pairs of said axles which support a plurality of said wheels, and wherein each of said pairs of axles are coupled to one of first and second members which members rotate relative to one another and are coupled to one another with a plurality of springs;

c) steering means for directing said chassis, wherein a servo motor is coupled to said drive motor and includes a screw follower means mounted to one of said first and second gear reduction means and coupled to said servo motor for extending and retracting said screw follower means to steer said chassis; and d) tool means for operating on a ferromagnetic work surface.

16. A vehicle as set forth in claim 15 wherein each of said plurality of magnetic wheels comprises at least one pole set including a plurality of magnetic pole pieces arranged about an annular keeper and wherein the vehicle is supported at a perimeter surface of the keeper of each pole set.

17. A vehicle as set forth in claim 16 including coupler means for flexibly supporting each wheel to one of said axles, whereby each wheel can flex relative to coaxial longitudinal axes along the axle and through each wheel Lo adjust to the work surface.

18. A vehicle as set forth in claim 15 wherein said tool means comprises a water sprayer having a plurality of spray heads mounted to rotate beneath a spray shroud.

19. A magnetic wheel comprising a plurality of pole sets, wherein each pole set includes a plurality of magnetic poles arranged about a bore of an annular keeper, wherein said plurality of pole sets are laminated to one another, wherein a bushing having a flexible core is fitted through the bore of the keeper of each pole set, whereby the wheel can mount to an axle of a supporting vehicle at said bushing and flex relative to the axle to adjust to a support surface.

20. A magnetic wheel as set forth in claim 15 wherein said magnetic pole pieces are constructed of a rare earth mixture including neodymium.

21. A magnetic vehicle comprising:

a) a chassis including a drive motor and a plurality of axles which support a plurality of permanent magnet wheels, wherein each of said plurality of permanent magnet wheels comprises a plurality of pole sets that are coupled side by side to one another, wherein each pole set includes a plurality of magnetic pole pieces arranged about a bore of an annular keeper, wherein a peripheral surface of the adjacent keepers defines a rolling surface of the wheel, and wherein coupler means flexibly support each wheel to one of said axles such that each wheel can flex relative to the axle to adjust to a support surface;

b) suspension means for resiliently supporting said wheels to said chassis; and c) steering means for directing said chassis.

22. A magnetic vehicle comprising:

a) a chassis including a drive motor and a plurality of axles which support a plurality of permanent magnet wheels, wherein said chassis comprises first and second frame sections, wherein pivot means having a pivot pin couple said first and second frame sections to one another to articulate at said pivot pin about one another, wherein each permanent magnet wheel comprises a plurality of pole sets that are coupled side by side to one another, and wherein each pole set includes a plurality of magnetic pole pieces that are circumferentially arranged about a bore of an annular keeper such that a peripheral surface of each keeper defines a rolling surface of each wheel;

b) suspension means for supporting said wheels to said chassis and including first and second torsion means for resiliently biasing drive axles mounted to said respective first and second sections relative to a rolling surface; and c) steering means for directing said chassis.

* * * * *